United States Patent [19]

Soeffker

[11] 4,152,014
[45] May 1, 1979

[54] IN-LINE HOSE SWIVEL

[76] Inventor: Eldred E. Soeffker, 2805 Sycamore La. North, Minneapolis, Minn. 55441

[21] Appl. No.: 873,221

[22] Filed: Jan. 30, 1978

[51] Int. Cl.² .................. F16L 13/10; F16L 27/00
[52] U.S. Cl. ........................... 285/7; 285/253; 285/272; 285/423; 285/DIG. 4; 285/DIG. 16
[58] Field of Search ....... 285/272, 280, 278, DIG. 16, 285/DIG. 4, 7

[56] References Cited

U.S. PATENT DOCUMENTS

| 929,734 | 8/1909 | Walder | 285/280 |
|---|---|---|---|
| 1,372,297 | 3/1921 | Kennedy | 285/280 |
| 2,862,731 | 12/1958 | Hedden et al. | 285/272 |
| 3,017,654 | 1/1962 | Allenby et al. | 285/280 X |
| 3,785,683 | 1/1974 | Adelhed | 285/278 X |
| 3,857,588 | 12/1974 | Curtin | 285/DIG. 16 X |
| 4,022,205 | 5/1977 | Tenczar | 285/DIG. 16 X |

FOREIGN PATENT DOCUMENTS 485885  5/1938  United Kingdom ............... 285/272

Primary Examiner—Thomas F. Callaghan
Attorney, Agent, or Firm—Williamson, Bains, Moore & Hansen

[57] ABSTRACT

A swivel coupling for joining lengths of flexible hose together incorporates a pair of cylindrical coupling members rotatably supported within a cylindrical housing at opposite ends thereof. Each of the rotary coupling members comprises an inner sleeve and an outer coupling collar joined by an annular shoulder segment. The annular shoulders bear against adjacent shoulders on opposite ends of the outer housing to restrain the rotary coupling members against outward displacement from the housing. Tubular end segments on each of the coupling collars project outwardly from the ends of the housing for the attachment of lengths of hose thereto.

4 Claims, 3 Drawing Figures

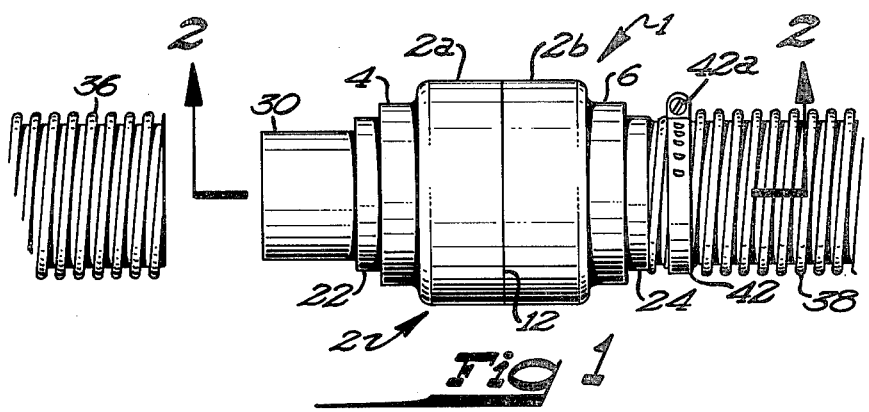
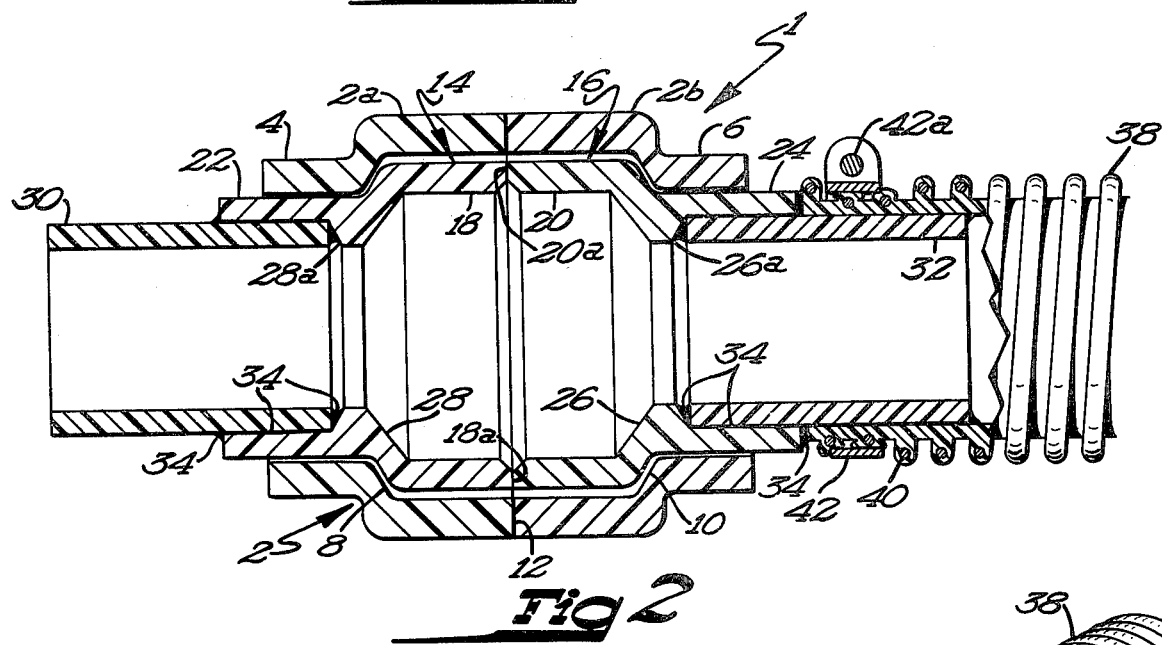
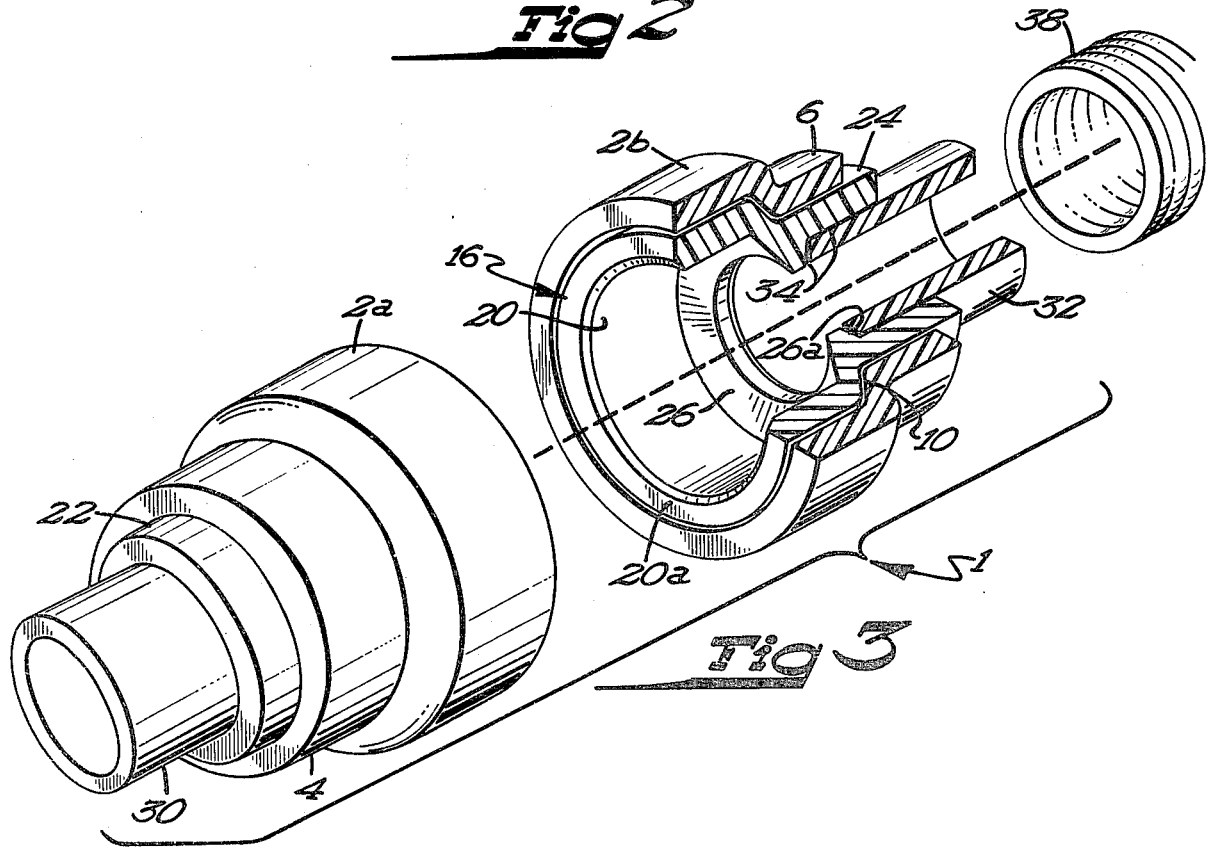

IN-LINE HOSE SWIVEL

BACKGROUND OF THE INVENTION

There are various applications involving the use of flexible hose wherein difficulties are encountered with kinking and tangling of the hose as it is coiled for storage or manipulated during use. Carpet cleaning is one of such applications. Flexible hose, normally made of plastic, is utilized in conjunction with a suction pump to remove cleaning solution which has been applied to rugs and carpeting. Relatively long lengths of hose are frequently utilized between a pickup head and a remotely located suction pump and solution collecting tank. Kinking of such suction hoses is a continuing problem, and there are no known coupling devices available which can be readily attached between lengths of hose in such a way as to permit coupled hose lengths to rotate relative to each other and thereby avoid kinking. The coupling unit disclosed herein has been developed for such a purpose.

BRIEF SUMMARY OF THE INVENTION

This invention is directed to a rotary coupling which is particularly characterized by an outer cylindrical housing within which two cylindrical coupling members are supported in such a way that they may rotate relative to each other with separate lengths of hose secured thereto while being securely restrained against displacement with respect to the longitudinal axis of the cylindrical housing.

These basic objectives are achieved by forming the outer housing with open, ring segments of reduced diameter at its opposite ends, with the ring segments being joined to the larger diameter cylindrical housing at annular shoulders extending around the periphery of the cylindrical housing. Adjacent, annular shoulder segments formed on the rotary coupling members between inner sleeves thereof and reduced diameter coupling collars on the outer ends thereof are positioned to bear against the inside faces of the housing annular shoulders, whereby the rotary coupling members are restrained against outer movement longitudinally of the housing. The inner ends of the rotary coupling members abut against each other in rotary contact along bearing surfaces extending generally normal to the longitudinal axis of the housing. In this manner, the rotary coupling members are securely restrained against displacement along the longitudinal axis of the cylindrical housing in either direction. The respective abutting ends of the rotary couplings and the annular shoulders of the outer housing provide bearing support surfaces for the rotary coupling members.

The swivel coupling is further characterized by tubular end segments provided on the coupling collars of each of the rotary coupling members for rotation therewith and extending longitudinally outwardly from opposite ends of the housing for the ready attachment of lengths of hose thereto. Advantageously, the coupling collars project longitudinally outwardly beyond the end extremities of the reduced diameter ring segments of the housing and serve as stops for the inner ends of hose lengths secured over the aforesaid tubular end segments.

As a further advantageous feature, the aforesaid cylindrical outer housing is comprised of two separate cylindrical pieces. Assembly of the coupling is readily accomplished by inserting each of the rotary coupling members through one of the housing cylinders with the aforesaid coupling collars projecting longitudinally outwardly beyond the ends of the cylindrical housing pieces. The two housing pieces are then abutted end to end and joined together with the inner ends of the rotary coupling members also abutting substantially at the center of the thus formed cylindrical housing.

These and other objects and advantages of this invention will become readily apparent as the following description is read in conjunction with the accompanying drawings wherein like reference numerals have been utilized to designate like elements throughout the several views.

BRIEF DESCRIPTION OF THE DRAWINGS

FIG. 1 is a side elevation view of the hose coupling of this invention showing the manner in which separate hose lengths may be positioned at opposite ends of the coupling;

FIG. 2 is a vertical section view of the coupling and a portion of one hose length taken along lines 2—2 of FIG. 1; and FIG. 3 is an exploded, perspective view of the two halves of the coupling assembly of FIG. 1, with portions thereof shown in section for clarity.

DESCRIPTION OF THE PREFERRED EMBODIMENT

In FIGS. 1 and 2 I have generally indicated the coupling unit of this invention by reference numeral 1. The outer housing 2 of the coupling unit or assembly is of cylindrical shape, and is comprised of two separate cylindrical housing pieces 2a and 2b. Housing 2 terminates at its opposite ends in open ring segments 4 and 6 of reduced diameter with respect to the central portion of housing 2. Ring segments 4 and 6 are joined to housing pieces 2a and 2b along annular shoulders 8 and 10 which extend around the periphery of the cylindrical housing in a plane which cuts across the longitudinal axis of the cylindrical housing 2. Housing pieces 2a and 2b are joined together at their inner ends along a central seam 12 by an adhesive material.

Rotatably supported inside of housing 2 are a pair of rotary coupling members 14 and 16 of generally cylindrical shape. Coupling members 14 and 16 are comprised of inner sleeves 18 and 20 joined to outer coupling collars 22 and 24 by annular shoulder segments 26 and 28 extending therebetween. Coupling collars 22 and 24 are of reduced diameter with respect to inner sleeves 18 and 20 of the coupling members 14 and 16 and extend within ring segments 4 and 6 of housing 2. Annular shoulder segments 26 and 28 lie in planes generally parallel to that defined by annular shoulders 8 and 10 of outer housing 2. Rotary coupling members 14 and 16 are positioned inside of housing 2 as shown in FIGS. 2 and 3 with the outside faces of their annular shoulder segments 26 and 28 bearing against the inside faces of housing annular shoulders 8 and 10. In this manner rotary coupling members 14 and 16 are restrained against outward movement longitudinally of housing 2. Also, the inside faces of housing annular shoulders 8 and 10 serve as bearing surfaces against which rotary coupling members 14 and 16 are supported for rotational movement about the longitudinal axis of housing 2. At their inner ends, rotary coupling members 14 and 16 abut against each other along end bearing surfaces 18a and 20a extending generally normal to the longitudinal axis of housing 2. End bearing surface 20a of rotary coupling 16 is clearly shown in FIG. 3. Thus, rotary coupling members 14 and 16 are securely positioned against displacement in either direction along the longitudinal axis of housing 2 between their inner, abutting end surfaces 18a, 20a and annular shoulders 8 and 10 of housing 2.

On the outer ends of each of the coupling collars 22 and 24 of coupling members 14 and 16 are tubular end segments 30 and 32. Tubular end segments 30 and 32 are affixed to collars 22 and 24 for rotation with coupling members 14 and 16 and extend longitudinally outwardly from the opposite ends of housing 2 for the attachment of lengths of hose thereto. Preferably, tubular end segments 30 and 32 extend inside of coupling collars 22 and 24 as shown and abut at their inner ends against outer annular faces 26a and 28a of annular shoulders segments 26 and 28. In this manner, annular faces 26a and 28a serve as locating stops for the slidable positioning of tubular end segments 30 and 32 within coupling collars 22 and 24.

Although the various components of the coupling assembly may be formed from various materials, I have found it particularly desirable to use plastic for this purpose. Outer housing cylindrical pieces 2a, 2b as well as rotary coupling members 14, 16 and tubular end segments 30 and 32 are all formed from the same plastic material, preferably ABS plastic. Plastic of this type is relatively smooth and provides a low friction resistance to the rotary contact of bearing surfaces 18a, 20a and 26, 28 and 8, 10 against each other. For the purpose of joining tubular end segments to coupling collars 22 and 24, a plastic glue known as ABS cement has proven to be particularly effective. The glue joints between tubular end segments 30, 32 and coupling collars 22, 24 are indicated by reference numeral 34. This same plastic glue may be utilized to form a glue seam along circular center joint 12 between cylindrical housing pieces 2a and 2b.

Two lengths of flexible hoses 36 and 38 are secured in place over tubular end segments 30 and 32, as is indicated with respect to hose length 38 in FIGS. 1 and 2. Existing hose lengths may be simply cut in two and the separate sections joined to opposite ends of coupling 1 over opposed, tubular end segments 30 and 32. Such hose as used as a suction hose in carpet cleaning operations is normally made of plastic, and is flexible. Spiral wound hose as shown in FIGS. 1 and 2 is commonly employed. Such hose is frequently reinforced by a wire 40 spiral wound within the outer periphery of the hose wall as shown in FIG. 2. Preferably, outer coupling collars 22 and 24 project longitudinally of housing 2 outwardly beyond the end extremities of housing ring segments 4 and 6 as shown, and serve as stops for the inner ends of hose lengths 36 and 38 secured over tubular end segments 30 and 32.

Various fastening means may be utilized to secure the flexible hoses over tubular end segments 30 and 32. I have found it particularly satisfactory to use hose clamps 42 of the type commonly employed on automobile radiator hoses, such clamps being tightened into place by fasteners 42a.

In assembling coupling unit 1 rotary coupling member 14 is inserted through housing half 2a with its outer coupling collar 22 projecting beyond end ring segment 4 and its annular shoulder segment 28 abutting or bearing against housing shoulder 8. The other rotary coupling member 16 is inserted within the other housing half 2b in the same manner. Then housing halves 2a and 2b are abutted against each other end to end and secured together along center seam 12 by a suitable plastic adhesive as indicated above. Coupling members 14 and 16 are of such a predetermined length that their inner ends 18a and 20a will abut against each other along bearing surfaces lying in a plane coinciding with the plane of center seam 12. If tubular end segments 30 and 32 are separate pieces, they will have been previously secured to coupling collars 22 and 24 along glue joints 34. It is contemplated that coupling collars 22 and 24 could be formed with extended, reduced diameter segments on their outer ends so as to make tubular end segments 30 and 32 integral therewith from the same piece of plastic material. In either case, tubular end segments 30 and 32 will normally be formed of a reduced diameter with respect to coupling collars 22 and 24 so that hose lengths such as those shown at 36 and 38 may be slidably positioned thereover in abutting contact with the outer ends of coupling collars 22 and 24.

It will be understood that the separate hose lengths 36 and 38, being independently secured through tubular end segments 30 and 32 to rotary coupling members 14 and 16 can rotate therewith, independently of each other. Such a coupling assembly has proven to be particularly effective in permitting the coupled hose lengths such as those shown at 36 and 38 to twist and turn with respect to each other without kinking. An extended length of such hose, comprised of multiple lengths of hose sections joined together by couplings 1 may be manipulated at will during carpet cleaning operations and coiled on a storage reel or mounting arm during periods of non-use without kinking.

I contemplate that various changes may be made in the size, shape and construction of the coupling device disclosed herein without departing from the spirit and scope of my invention as defined by the following claims.

What is claimed is:

1. A swivel coupling for use with flexible hoses comprising:

a cylindrical housing terminating at its opposite ends in open cylindrical ring segments of reduced diameter with respect to said housing, said ring segments being joined to said cylindrical housing at annular shoulders extending around the periphery of said cylindrical housing in a plane extending across the longitudinal axis of said cylindrical housing, said cylindrical housing being comprised of two pieces adhesively joined along a circular center joint of said housing;

a pair of cylindrical, rotary coupling members supported within said cylindrical housing for non-translational rotational movement about the longitudinal axis of said housing, each of said coupling members being comprised of an inner sleeve and an outer, reduced diameter coupling collar connected thereto by an annular shoulder segment extending therebetween, said coupling collars extending within said ring segments of said housing, and the outside faces of said coupling member shoulder segments bearing against the inside faces of said housing annular shoulders, whereby said rotary coupling members are restrained against outward movement longitudinally of said housing, and the inner ends of said rotary coupling members abutting against each other in rotary contact along bearing surfaces extending generally normal to the longitudinal axis of said housing;

a tubular end segment on each of said rotary coupling members for rotation therewith, said tubular end segments extending longitudinally outwardly from opposite ends of said housing for the attachment of lengths of hose thereto;

said coupling collars of said coupling members projecting longitudinally of said housing outwardly beyond the end extremities of said reduced diameter ring segments and serve as stops for the inner ends of hose lengths secured over said tubular end segments, the diameter of said coupling collars adjacent said ring segments being only slightly less than the inner diameter of said ring segments so as to assist in sealing and prevent skewing of said coupling members in said housing.

2. A swivel coupling as defined in claim 1 wherein: said tubular end segments are separate pieces secured to said outer coupling collars of said rotary coupling members for rotation therewith.

3. A swivel coupling as defined in claim 2 wherein: said rotary coupling members and said tubular end segments are made of plastic and are joined together by a plastic adhesive.

4. A swivel coupling as defined in claim 2 wherein: said tubular end segments extend inside of said outer coupling collars and abut at their inner ends against the outer annular faces of said annular shoulder segments of said rotary coupling members.

* * * * *